(12) United States Patent
Gaffney et al.

(10) Patent No.: US 11,787,367 B1
(45) Date of Patent: Oct. 17, 2023

(54) SYSTEMS FOR SHARED VEHICLE ACCESS

(71) Applicant: Geotab Inc., Oakville (CA)

(72) Inventors: Benjamin John Gordon Gaffney, Waterloo (CA); Thomas James Wallis, Kitchener (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 17/901,989

(22) Filed: Sep. 2, 2022

Related U.S. Application Data

(60) Provisional application No. 63/328,422, filed on Apr. 7, 2022.

(51) Int. Cl.
*B60R 25/24* (2013.01)
*B60R 25/25* (2013.01)
*B60R 25/01* (2013.01)
*G06Q 10/02* (2012.01)
*B60R 25/04* (2013.01)

(52) U.S. Cl.
CPC ............ *B60R 25/241* (2013.01); *B60R 25/01* (2013.01); *B60R 25/04* (2013.01); *B60R 25/25* (2013.01); *G06Q 10/02* (2013.01); *B60R 2325/105* (2013.01); *B60R 2325/106* (2013.01)

(58) Field of Classification Search
CPC ....... B60R 25/241; B60R 25/01; B60R 25/25; G06Q 10/02
USPC ....................................................... 235/382
See application file for complete search history.

(56) References Cited

U.S. PATENT DOCUMENTS

| 7,366,677 B1* | 4/2008 | Liu ................. G06Q 10/02 709/204 |
| 8,768,565 B2 | 7/2014 | Jefferies |
| 9,442,888 B2 | 9/2016 | Stanfield |
| 9,499,128 B2* | 11/2016 | Reh .................... G01S 19/51 |
| 9,807,547 B1 | 10/2017 | Oesterling |
| 9,818,151 B2 | 11/2017 | Ehrman |
| 9,845,071 B1 | 12/2017 | Krishnan |
| 10,106,172 B2 | 10/2018 | Wingfield |
| 10,515,489 B2* | 12/2019 | Jefferies ............ B60R 25/24 |
| 11,447,097 B1 | 9/2022 | Flick |
| 2011/0112969 A1* | 5/2011 | Zaid ................. H04W 4/027 701/2 |
| 2013/0338883 A1 | 12/2013 | Savoure |
| 2017/0134382 A1* | 5/2017 | Darnell ............. H04W 4/029 |
| 2017/0178035 A1 | 6/2017 | Grimm |
| 2017/0186251 A1 | 6/2017 | Lee |
| 2017/0282859 A1* | 10/2017 | Grimm .............. H04W 12/08 |
| 2017/0308817 A1 | 10/2017 | Miller |
| 2017/0316535 A1 | 11/2017 | Hirose |
| 2018/0047220 A1 | 2/2018 | Savoure |
| 2019/0001926 A1 | 1/2019 | Arakawa |
| 2019/0092279 A1 | 3/2019 | Jarvis |
| 2019/0109855 A1 | 4/2019 | Takeuchi |

(Continued)

*Primary Examiner* — Ahshik Kim
(74) *Attorney, Agent, or Firm* — Mark J. Pringle-Rigby

(57) ABSTRACT

To utilize a shared vehicle, a user can request access to the vehicle, which results in the generation of a virtual key. The virtual key is provided to a plurality of different devices, such as a vehicle device at the vehicle, and a user device in the possession of the user. Access to the vehicle can be granted and maintained by verification of the virtual key against data from an identification device at the vehicle, or from the user device. In this way, multiple options for vehicle access are available to the user, which increases flexibility and user-friendliness.

14 Claims, 2 Drawing Sheets

(56) References Cited

U.S. PATENT DOCUMENTS

2019/0156605 A1    5/2019  Tang
2020/0356652 A1*  11/2020  Yamaguchi ............ G06Q 50/10

* cited by examiner

SYSTEMS FOR SHARED VEHICLE ACCESS

TECHNICAL FIELD

The present application claims priority to U.S. Provisional Patent Application No. 63/328,422, filed Apr. 7, 2022, titled "SYSTEMS, DEVICES, AND METHODS FOR SHARED VEHICLE ACCESS", the entirety of which is incorporated herein by reference.

TECHNICAL FIELD

The present disclosure generally relates to systems, devices, and methods for managing shared vehicles, and in particular relates to controlling access to shared vehicles.

BACKGROUND

In many scenarios, it is desirable for a vehicle or plurality of vehicles to be shared between different users. As one example, a commercial vehicle fleet may include a plurality of vehicles which are operated by rotating drivers. As another example, a vehicle rental agency may have a plurality of vehicles, which are rented out to different users. To provide vehicle access to different users, it is desirable to have systems, devices, or methods for assigning, identifying, or checking vehicle access privileges of candidate users in order to provide or deny vehicle access appropriately.

SUMMARY

According to a broad aspect, the present disclosure describes a method comprising: receiving, by a reservation management device, a virtual key request from a user for accessing a vehicle by the user; generating, by the reservation management device, a first virtual key in response to the virtual key request; providing, by the reservation management device, the first virtual key to a vehicle device positioned at the vehicle, wherein the vehicle device is communicatively coupled to an identification device positioned at the vehicle; providing, by the reservation management device, the first virtual key to a first user device separate from the vehicle; authenticating the user by the vehicle device, based on one of: verification of credentials of the user received by the identification device to the first virtual key provided to the vehicle device; or verification of the first virtual key provided to the first user device to the first virtual key provided to the vehicle device; and after authenticating the user, providing, by the vehicle device, access to the vehicle for the user.

Receiving, by the reservation management device, the virtual key request for accessing the vehicle by the user may comprise: receiving the virtual key request from the vehicle device, in response to an interaction event by the user with the identification device.

Receiving, by the reservation management device, the virtual key request for accessing the vehicle by the user may comprise: receiving the virtual key request from the first user device. Receiving the virtual key request from the first user device may comprise: receiving the virtual key request from the first user device via the vehicle device.

Receiving, by the reservation management device, the virtual key request for accessing the vehicle by the user may comprise: receiving the virtual key request from a second user device separate from the vehicle and different from the first user device. Receiving the virtual key request from the second user device may comprise: receiving the virtual key request from the second user device via the internet.

Authenticating the user by the vehicle device may be based on verification of credentials of the user received by the identification device to the first virtual key provided to the vehicle device; and the method may further comprise, after providing vehicle access to the user, maintaining vehicle access for the user, by authenticating the user based on verification of the first virtual key provided to the first user device to the first virtual key provided to the vehicle device.

Authenticating the user by the vehicle device may be based on verification of the first virtual key provided to the first user device to the first virtual key provided to the vehicle device; and the method may further comprise, after providing vehicle access to the user, maintaining vehicle access for the user, by authenticating the user based on verification of credentials of the user received by the identification device to the first virtual key provided to the vehicle device.

The identification device may be a device selected from a group of devices consisting of: an RFID reader; a biometric sensor; and a user input device.

The vehicle device may comprise a telematics monitoring device installed in the vehicle.

The reservation management device may comprise a reservation management server.

The first user device may comprise a portable device.

Providing access to the vehicle for the user may comprise unlocking at least one door of the vehicle.

Providing access to the vehicle for the user may comprise enabling operation of a motor of the vehicle.

According to another broad aspect, the present disclosure describes a system comprising: a vehicle device including at least one first processor, a first communication interface communicatively coupled to the at least one first processor, and at least one first non-transitory processor-readable storage medium communicatively coupled to the at least one first processor, the at least one first non-transitory processor-readable storage medium storing first processor-executable instructions; and a reservation management device including at least one second processor, a second communication interface communicatively coupled to the at least one second processor, and at least one second non-transitory processor-readable storage medium communicatively coupled to the at least one second processor, the at least one second non-transitory processor-readable storage medium storing second processor-executable instructions which when executed by the at least one second processor cause the reservation management device to: generate, by the at least one second processor, a first virtual key in response to a virtual key request received by the second communication interface from a user for accessing, by the user, a vehicle in which the vehicle device is positioned; provide, by the second communication interface, the first virtual key to the vehicle device; and provide, by the second communication interface, the first virtual key to a first user device accessible to the user, the first user device being a separate device from the vehicle device, wherein the first processor-executable instructions, when executed by the at least one first processor, cause the vehicle device to: authenticate, by the at least one first processor, the user based on one of: verification of credentials of the user to the first virtual key provided to the vehicle device, the credentials of the user received by an identification device positioned at the vehicle and communicatively coupled to the vehicle device; or verification of the first virtual key provided to the first user device to the first virtual key provided to the vehicle device; and after authenticating the user, provide access to the vehicle for the user.

The first processor-executable instructions may further cause the vehicle device to send the virtual key request to be received by the reservation management device in response to an interaction event by the user with the identification device.

The virtual key request may be received by the reservation management device from the first user device. The virtual key request may be received by the reservation management device from the first user device via the vehicle device.

The virtual key request may be received by the reservation management device from a second user device separate from the vehicle device and different from the first user device. The virtual key request may be received by the reservation management device from the second user device via the internet.

The first processor-executable instructions which cause the vehicle device to authenticate the user may cause the at least one first processor to: authenticate the user based on verification of credentials of the user to the first virtual key provided to the vehicle device, the credentials of the user received by the identification device positioned at the vehicle and communicatively coupled to the vehicle device; and the first processor-executable instructions may further cause the vehicle device to: after providing vehicle access to the user, maintain vehicle access for the user, by authenticating the user based on verification of the first virtual key provided to the first user device to the first virtual key provided to the vehicle device.

The first processor-executable instructions which cause the vehicle device to authenticate the user may cause the at least one first processor to: authenticate the user based on verification of the first virtual key provided to the first user device to the first virtual key provided to the vehicle device; and the first processor-executable instructions may further cause the vehicle device to: after providing vehicle access to the user, maintain vehicle access for the user, by authenticating the user based on verification of credentials of the user to the first virtual key provided to the vehicle device, the credentials of the user received by the identification device positioned at the vehicle and communicatively coupled to the vehicle device.

The system may further comprise the identification device, wherein the identification device is a device selected from a group of devices consisting of: an RFID reader; a biometric sensor; and a user input device.

The vehicle device may comprise a telematics monitoring device installable in the vehicle.

The reservation management device may comprise a reservation management server.

The first user device may comprise a portable device.

The first processor-executable instructions which cause the at least one first processor to provide vehicle access to the user may cause the at least one first processor to: unlock at least one door of the vehicle.

The first processor-executable instructions which cause the at least one first processor to provide vehicle access to the user may cause the at least one first processor to: enable operation of a motor of the vehicle.

BRIEF DESCRIPTION OF THE DRAWINGS

Exemplary non-limiting embodiments are described with reference to the accompanying drawings in which.

DETAILED DESCRIPTION

The present disclosure details systems, methods, and devices for managing access to shared vehicles.

Figure 1:
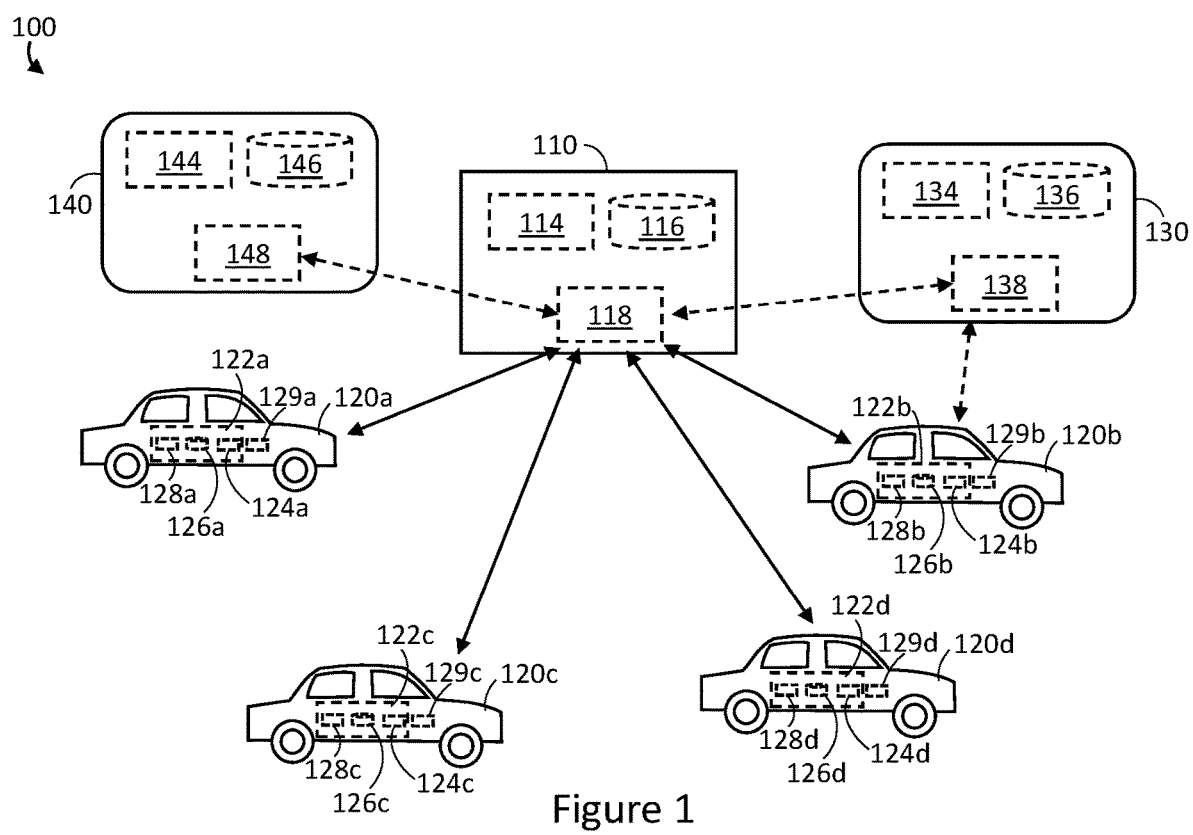
FIG. 1 is a schematic view of a system for managing shared vehicle access.

FIG. 1 is a schematic view of a system 100 for managing shared vehicle access. FIG. 1 shows a reservation management device 110, which includes at least one processor 114, at least one non-transitory processor-readable storage medium 116 communicatively coupled to the at least one processor 114, and a communication interface 118 communicatively coupled to the at least one processor 114. For example, reservation management device 110 can comprise a reservation management server which services a plurality (or fleet) of vehicles. Although illustrated as one device, reservation management device 110 can include a plurality of devices, a plurality of processors 114, a plurality of non-transitory processor-readable storage mediums 116, and/or a plurality of communication interfaces 118. Further, such a plurality of reservation management devices can be in close proximity (e.g. in a central server location), or can be distributed across different locations (e.g. as remote devices). Communication interface 118 can be a wired or wireless interface, through which reservation management device 110 communicates with other devices, such as a plurality of vehicles, vehicle devices, or user devices.

The at least one non-transitory processor-readable storage medium 116 can store processor-executable instructions which, when executed by the at least one processor 114, cause the reservation management device 110 to perform appropriate acts, such as acts in method 200 described with reference to FIG. 2 later.

In the illustrated example, reservation management device 110 is shown as communicating with vehicle devices in four vehicles 120a, 120b, 120c, and 120d (collectively referred to as vehicles 120). However, reservation management device 110 could communicate with vehicle devices in any appropriate number of vehicles, such as one vehicle, dozens of vehicles, hundreds of vehicles, thousands of vehicles, or even more vehicles.

Vehicle 120a includes at least one processor 124a, at least one non-transitory processor-readable storage medium 126a, a communication interface 128a, and an identification device 129a. Together, the at least one processor 124a, the at least one non-transitory processor-readable storage medium 126a, and the communication interface 128a can be referred to as "vehicle device" 122a. Identification device 129a is shown as being separate from vehicle device 122a, but in some implementations identification device 129a can be included in vehicle device 122a.

Vehicle 120b includes at least one processor 124b, at least one non-transitory processor-readable storage medium 126b, a communication interface 128b, and an identification device 129b. Together, the at least one processor 124b, the at least one non-transitory processor-readable storage medium 126b, and the communication interface 128b can be referred to as "vehicle device" 122b. Identification device 129b is shown as being separate from vehicle device 122b, but in some implementations identification device 129b can be included in vehicle device 122b.

Vehicle 120c includes at least one processor 124c, at least one non-transitory processor-readable storage medium 126c, a communication interface 128c, and an identification device 129*c*. Together, the at least one processor 124*c*, the at least one non-transitory processor-readable storage medium 126*c*, and the communication interface 128*c* can be referred to as "vehicle device" 122*c*. Identification device 129*c* is shown as being separate from vehicle device 122*c*, but in some implementations identification device 129*c* can be included in vehicle device 122*c*.

Vehicle 120*d* includes at least one processor 124*d*, at least one non-transitory processor-readable storage medium 126*d*, a communication interface 128*d*, and an identification device 129*d*. Together, the at least one processor 124*d*, the at least one non-transitory processor-readable storage medium 126*d*, and the communication interface 128*d* can be referred to as "vehicle device" 122*d*. Identification device 129*d* is shown as being separate from vehicle device 122*d*, but in some implementations identification device 129*d* can be included in vehicle device 122*d*.

Collectively, vehicle 120*a*, vehicle 120*b*, vehicle 120*c*, and vehicle 120*d* can be referred to as "vehicles 120". Alternatively, reference to "a vehicle 120" refers to any one of vehicle 120*a*, vehicle 120*b*, vehicle 120*c*, and vehicle 120*d*. Collectively, the at least one processor 124*a*, the at least one processor 124*b*, the at least one processor 124*c*, and the at least one processor 124*d* can be referred to as "processors 124". Alternatively, reference to "at least one processor 124" refers to any one of the at least one processor 124*a*, the at least one processor 124*b*, the at least one processor 124*c*, and the at least one processor 124*d*. Collectively, the at least one non-transitory processor-readable storage medium 126*a*, the at least one non-transitory processor-readable storage medium 126*b*, the at least one non-transitory processor-readable storage medium 126*c*, and the at least one non-transitory processor-readable storage medium 126*d* can be referred to as "non-transitory processor-readable storage mediums 126". Alternatively, reference to "the at least one non-transitory processor-readable storage medium 126" refers to any one of the at least one non-transitory processor-readable storage medium 126*a*, the at least one non-transitory processor-readable storage medium 126*b*, the at least one non-transitory processor-readable storage medium 126*c*, and the at least one non-transitory processor-readable storage medium 126*d*. Collectively, communication interface 128*a*, communication interface 128*b*, communication interface 128*c*, and communication interface 128*d* can be referred to as "communication interfaces 128". Alternatively, reference to a "communication interface 128" refers to any one of communication interface 128*a*, communication interface 128*b*, communication interface 128*c*, and communication interface 128*d*. Collectively, identification device 129*a*, identification device 129*b*, identification device 129*c*, and identification device 129*d* can be referred to as "identification devices 129*d*". Alternatively, reference to an "identification device 129" refers to any one of identification device 129*a*, identification device 129*b*, identification device 129*c*, and identification device 129*d*. Collectively, vehicle device 122*a*, vehicle device 122*b*, vehicle device 122*c*, and vehicle device 122*d* can be referred to as "vehicle devices 122". Alternatively, reference to a "vehicle device 122" refers to any one of vehicle device 122*a*, vehicle device 122*b*, vehicle device 122*c*, and vehicle device 122*d*.

For each of the vehicles 120 and vehicle devices 122, the corresponding at least one processor 124 is communicatively coupled to the corresponding at least one non-transitory processor-readable storage medium 126, the corresponding communication interface 128, and the corresponding identification device 129. For each vehicle device 120, the corresponding at least one non-transitory processor-readable storage medium 126 can store processor-executable instructions, which when executed by the corresponding at least one processor 124 cause the vehicle device 120 to perform appropriate acts, such as acts described with reference to method 200 in FIG. 2.

Any of the communication interfaces 128 can be a wired interface or a wireless interface, or a vehicle device 120 can include both a wired communication interface and a wireless communication interface.

The identification devices described herein refer to devices which can receive input from a user which can be used to verify the identity of the user. As one example, an identification device can comprise an identity device reader (such as a card reader, fob reader, or smart-device reader for RFID or NFC identity cards, fobs, or smart-devices such as smartphones). When a user scans an identity card, fob, or smart-device (e.g. by swiping the card, or placing the card, fob, or smart-device proximate the identity device reader), the user's credentials are read by the identity device reader, (e.g. user name, number, or code). As another example, an identification device can comprise a biometric sensor, such as a fingerprint reader, a retinal scanner, or a voice reader. A user provides the appropriate interaction (e.g placing their finger on the fingerprint sensor, positioning their eye for the retinal scanner, or speaking a phrase to the voice reader). As another example, an identification device can comprise another form of user input device, such as a keyboard, number pad, or touchscreen, as examples. The user can input their credentials (such as a username, passcode, or authentication gesture) to the user input device. Further, the identification devices discussed herein could include multiple forms of identification devices as appropriate. For example, an identification device could comprise an identity device reader and a fingerprint reader, to ensure that the person using the identity device is actually the owner of the identity device (by two-factor verification with a fingerprint).

Each of vehicle devices 122 can be a monolithically packaged device (i.e. a device contained in a single housing) which is installed in a respective vehicle. For example, any of vehicle devices 122 can comprise a telematics monitoring device installed in a respective vehicle 120, which collects and transmits telematics data to a remote device or server. However, this is not necessarily the case, and each vehicle device 122 can refer to the collection of components installed in a vehicle (i.e. they do not have to be packaged in a single housing). Further, components of any of the vehicle devices 122 can be multi-purpose components which serve other functions within the vehicle.

System 100 is also illustrated in FIG. 1 as including (or interacting with) a user device 130. User device 130 can further include any of at least one processor 134, at least one non-transitory processor-readable storage medium 136, and a communication interface 138. As one example, user device 130 could be a personal device belonging to or in the possession of a user, such as a smartphone, PDA, tablet, or any similar device. User device 130 can communicate with a vehicle device 122 (e.g. via communication interface 138). In FIG. 1, user device 130 is shown as communicating with vehicle device 122*b* in vehicle 120*b*, but user device 130 could also communicate with any of vehicle devices 122*a*, 122*c*, or 122*d* in respective vehicles 120*a*, 120*c*, and 120*d*, or any other vehicle device, as appropriate for a given application. In some implementations, user device 130 communicates with reservation management device 110 (e.g. via communication interfaces 118 and 138) as illustrated in FIG. 1. In some implementations, user device 130 communicates with a vehicle device 122 and with reservation management device 110. Preferably, user device 130 is a portable device which can be carried by a user to a location of a vehicle to be used by the user, as discussed in more detail later.

System 100 is also illustrated in FIG. 1 as optionally including (or interacting with) an additional user device 140. User device 140 can further include any of at least one processor 144, at least one non-transitory processor-readable storage medium 146, and a communication interface 148. As one example, user device 140 could be a personal device belonging to a user, such as a smartphone, PDA, tablet, personal computer, laptop or any similar device. In some implementations, user device 140 communicates with reservation management device 110 (e.g. via communication interfaces 118 and 148) as illustrated in FIG. 1. User device 130 and user device 140 can be the same type of device, or could be different types of devices. An advantage of implementing two user devices 130 and 140 is that one user device can be used for requesting a virtual key, and the other user device can be used for accessing a vehicle. This is discussed in more detail later.

One skilled in the art will appreciate that not all of the components of system 100 in FIG. 1 are required for the system to function. As examples, user devices 130 and 140 are optional, and can be omitted in some implementations. Further, in some implementations user devices 130 and 140 may not be grouped as part of system 100, but instead may be outside of system 100, and interact with system 100.

Figure 2:
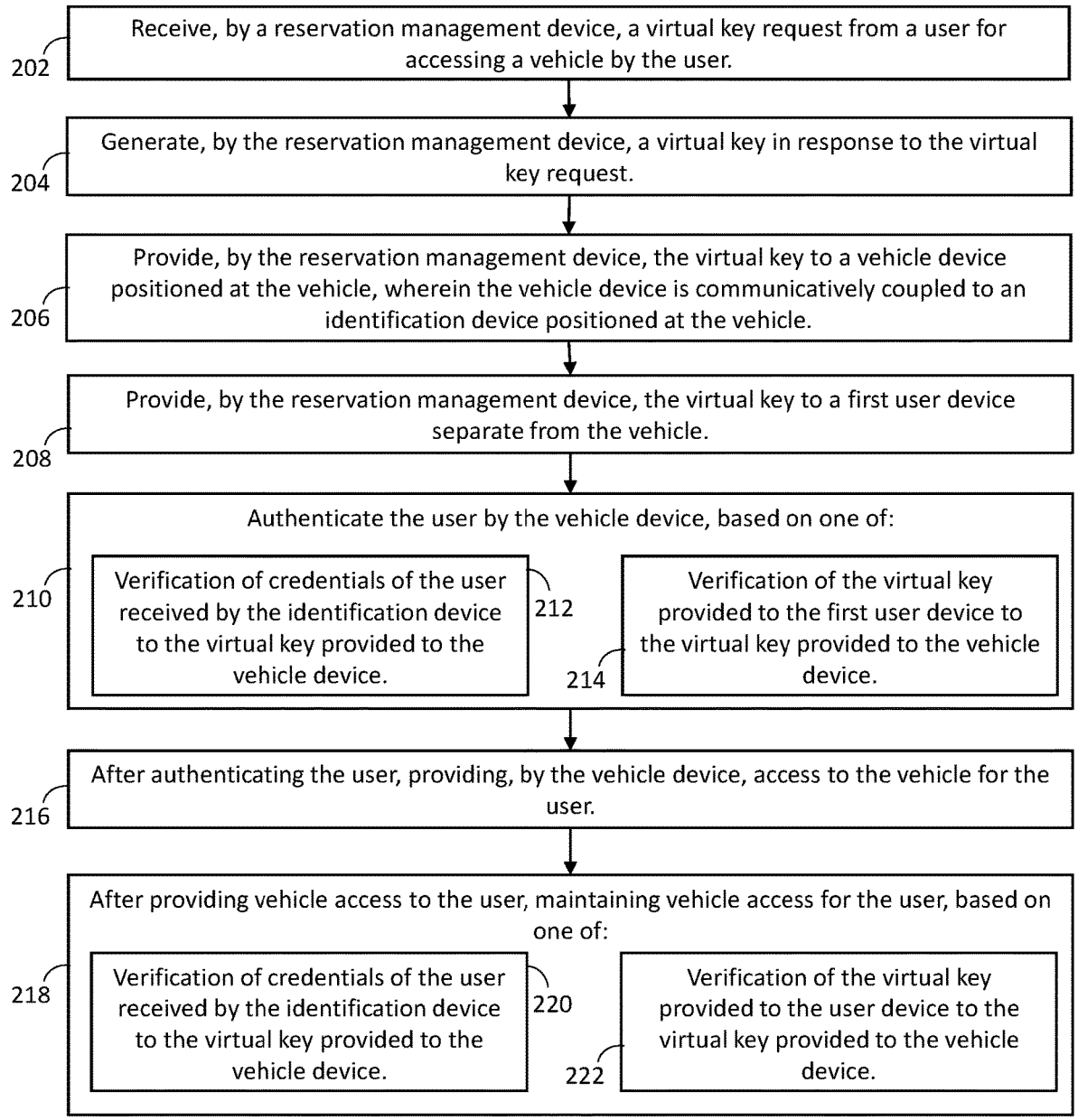
FIG. 2 is a flowchart diagram of an exemplary method for managing shared access to a vehicle.

FIG. 2 is a flowchart diagram which illustrates an exemplary method 200 performed by devices such as those in FIG. 1. Method 200 as illustrated includes acts 202, 204, 206, 208, 210 (including sub-acts 212 and 214), 216, and 218 (including sub-acts 220 and 222). One skilled in the art will appreciate that additional acts could be added, acts could be removed, or acts could be reordered as appropriate for a given application. With reference to the example illustrated in FIG. 1, acts can be performed by appropriate components of reservation management device 110, vehicle devices 122, user device 130, or user device 140. Further, any of the at least one non-transitory processor-readable storage mediums 116, 126, 136, or 146 could have instructions stored thereon, which when executed by a respective at least one processor (processors 114, 124, 134 or 144) cause the respective reservation management device 110, vehicle device 122, user device 130, or user device 140 to perform a given act of method 200. In the discussion of method 200 below, reference to an act being performed by a vehicle device 122 refers to the act being performed by any of vehicle devices 122a, 122b, 122c, or 122d. Reference to an act being performed by at least one processor 124 refers to the act being performed by any of processors 124a, 124b, 124c, or 124d. Reference to an act being performed by at least one non-transitory processor-readable storage medium 126 refers to the act being performed by any of non-transitory processor-readable storage mediums 126a, 126b, 126c, or 126d. Reference to an act being performed by communication interface 128 refers to the act being performed by any of communication interfaces 128a, 128b, 128c, or 128d. Reference to an act being performed by identification device 129 refers to the act being performed by any of identification devices 129a, 129b, 129c, or 129d. Typically, for a combination of acts performed by a combination of at least one processor, at least one non-transitory processor-readable storage medium, a communication interface of a vehicle device, and an identification device, the combination of acts is performed by at least one processor, at least one non-transitory processor-readable storage medium, a communication interface, an identification device, and a vehicle device common to one of vehicles 120a, 120b, 120c, or 120d (or any other similar vehicle).

At 202, reservation management device 110 receives (via communication interface 118) a virtual key request from a user for accessing a vehicle 120 by the user. The virtual key request can be provided to reservation management device 110 in several different ways discussed below. The virtual key request can take the form of a request to use the vehicle by the user. That is, an action taken by the user (several examples discussed below) indicates that the user wishes to use the vehicle (either immediately or at a later time for which a vehicle reservation is desired).

In a first case, at 202 the reservation management device 110 receives the virtual key request from a vehicle device 122 of vehicle 120, in response to an interaction event by the user with an identification device 129 positioned at vehicle 120. For example, the user may tap an RFID card to an RFID card reader of the vehicle, touch their finger to a fingerprint sensor of the vehicle, scan an identity device (e.g. smartphone) to an NFC reader of the vehicle, or input a request to use the vehicle by a user input device of the vehicle, as non-limiting examples. Other forms of identification and identification devices are possible, such as the examples discussed earlier. Each of these interaction events can be interpreted as a user indicating a desire or intention to use the vehicle (i.e., the user is requesting vehicle access, which is indirectly a request for a virtual key to access the vehicle). In response to the interaction event, the vehicle device 122 sends a virtual key request to reservation management device 110 (via a communication interface 128 and received by communication interface 118).

In a second case, the reservation management device 110 receives the virtual key request from user device 130 (via communication interfaces 118 and 138). User device 130 can later be used to access the vehicle, as is discussed later. For example, user device 130 can be a smartphone of the user, and the user can use a program or application on the smartphone to make a reservation to use the vehicle 120. This could be performed adjacent the vehicle (e.g., the user inputs a request to use the vehicle while standing next to the vehicle), or could be performed a significant distance from the vehicle (e.g. the user inputs a request to use the vehicle from their home in advance of going to the vehicle). The virtual key request can be transmitted from the user device 130 to the reservation management device 110 via any appropriate means, such as via the internet, cellular data connection, wireless network connection, or any other appropriate direct or indirect communication mechanism.

In a third case (similar to the second case), the virtual key request can be received by the reservation management device 110 from user device 130, via vehicle device 122. For example, the user device 130 can connect to the vehicle device 122 (via communication interfaces 128 and 138; e.g. via Bluetooth or short-range wireless connection), and provide a virtual key request to the vehicle device 122. In turn, the vehicle device 122 can forward this virtual key request to the reservation management device 110, via a communication interface 128. For example, the vehicle device 122 can forward the virtual key request to the reservation management device over the internet via a cellular connection of the vehicle device 122.

In a fourth case, the reservation management device 110 receives the virtual key request from user device 140 (e.g. via communication interfaces 148 and 118). User device 140 can be any appropriate device as discussed above, which is separate from the vehicle 120 and is not user device 130

(though user device 140 can in some cases be the same type of device as user device 130). For example, user device 140 can be a computer of the user, and the user can use a program or application on the computer to make a reservation to use the vehicle 120. The virtual key request can be transmitted from the user device 140 to the reservation management device 110 via any appropriate means, such as via the internet, cellular data connection, wired network connection, wireless network connection, or any other appropriate direct or indirect communication mechanism. User device 140 is not limited to being a computer, as is mentioned earlier. Subsequently, a different device from user device 140 (such as user device 130 or identification device 129) can be used to access the vehicle, as is discussed later with reference to act 218.

Other implementations are possible for how a virtual key request can be provided to and received by reservation management device 110. Further, each of the above discussed exemplary cases are not exclusive. In particular, a system can be designed and implemented where a virtual key request can be provided to and received by reservation management device 110 in accordance with any of the first case, the second case, the third case, and the fourth case described above. That is, the system can be flexible to accommodate any appropriate means for receiving a virtual key request by the reservation management device 110.

At 204, the reservation management device 110 generates (e.g. by the at least one processor 114) a virtual key in response to the virtual key request. The virtual key can be generated after verification of the user from which the virtual key request is received (i.e. verification that the user is authorized to use the vehicle 120, or that the vehicle is available for the time requested by the user). For example, the at least one processor 114 can validate credentials of the user (such as user identification, access code, or password, as non-limiting examples), and if the user is authorized to access the vehicle, the virtual key is generated in accordance with access privileges of the user.

At 206, the reservation management device 110 provides (e.g. by the communication interfaces 118 and 128) the virtual key to the vehicle device 122. At 208, the reservation management device 110 provides (e.g. by the communication interfaces 118 and 138) the virtual key to the user device 130 which is separate from the vehicle 120. That is, the virtual key is provided to two different devices, one located at the vehicle, and one in possession of the user. This enables multiple different pipelines for authenticating the user and providing vehicle access, as discussed below. In some implementations, the reservation management device 110 sends the virtual key at 206 and/or 208 to be stored at the vehicle device 122 and/or the user device 130, respectively. This is not necessarily the case, however. In some implementations, "providing the virtual key" can refer to providing aspects related to the key used for decryption. In a specific example, act 206 could comprise sending a public key modulus to the vehicle device 122. This public key modulus is used during verification of the user (discussed below at 210), to check that a certain sequence of bytes in the virtual key at the user device 130 decrypts to a specific value.

At 210, the user is authenticated by vehicle device 122 (e.g. by the at least one processor 124). This can be performed in two alternative ways as discussed with reference to sub-acts 212 and 214 below.

At sub-act 212, credentials of the user received by the identity reading device 129 are verified to the virtual key provided to vehicle device 122 by the reservation management device 110. In the first case discussed above, where the virtual key request is initiated in response to a user interaction event with the identification device 129, the credentials of the user can be collected during the interaction event. In the second, third, and fourth cases discussed above, where the virtual key request (e.g. reservation of the vehicle) is initiated by another device (user device 130 or 140 in the example cases), the user can subsequently interact with the identification device 129 in order to gain access to the vehicle 120 in accordance with the virtual key request (e.g. the user can commence using the vehicle 120 in accordance with the reservation). The credentials of the user are evaluated or transferred to the vehicle device 122 for evaluation in response to this interaction.

At sub-act 214, the virtual key provided to the user device 130 is verified to the virtual key provided to the vehicle device 122 (or based on a public key modulus as discussed above). In the second and third cases discussed above, where the virtual key request is initiated from the user device 130, verification of the virtual key can occur in response to the interaction event where the user makes the virtual key request with the user device 130. In the first and fourth cases discussed above, where the virtual key request (e.g. reservation of the vehicle) is initiated by another device (identification device 129 or user device 140 in the examples), the user can subsequently use the user device 130 in order to gain access to the vehicle in accordance with the virtual key request (e.g. the user can commence using the vehicle in accordance with the reservation). For example, the user could connect the user device 130 to the vehicle device 122 (e.g. by short-range communications such as Bluetooth®), or by scanning the user device 130 to identification device 129 (e.g. scanning a smartphone to an NFC reader). The virtual key received by user device 130 is verified against the virtual key provided to the vehicle device 122 in response to such connection or interaction.

At 216, after authenticating the user in act 210, the vehicle device 122 provides access to the vehicle 120 to this user. For example, the at least one processor 124 can cause at least one door lock of the vehicle 120 to unlock for the user. As another example, the at least one processor 124 can enable operation of a motor of the vehicle 120. This could be performed for example by sending an authorization or enable signal to a wire-management module which enables an electrical signal from a vehicle ignition to the motor, so that the vehicle can be operated, as is described in U.S. Provisional Patent Application No. 63/227,375.

What level of vehicle access, or specifically what aspects of a vehicle the user is given access to, may depend on a role or credentials of the user. For example, if the user has a role to clean the interior of vehicles in a fleet, only the vehicle doors may unlock so that the user can clean the vehicle, but cannot drive it. As another example, if the user has a role to perform mechanical servicing to the vehicle, the user may be provided with full access to all vehicle systems. As another example, if the user has a role to drive the vehicle, the user may be provided with access only to vehicle systems related to driving the vehicle, and may be denied access to operational components of the vehicle such as diagnostic ports or the motor compartment.

By providing the virtual key to two separate devices (the vehicle device 122 in act 206; the user device 130 in act 208), authentication and access by multiple pipelines are enabled. This improves flexibility of the vehicle access system to accommodate reservations and access across multiple devices.

Method 200 in FIG. 2 also illustrates optional act 218, which includes sub-acts 220 and 222. At 218, after vehicle access has been provided to the user, vehicle access for the user is maintained in accordance with sub-act 220 or sub-act 222. Specifically, in order to maintain security of vehicle 120, in some implementations vehicle access to the user can expire. For example, after vehicle access has been provided to the user, if the vehicle has not been utilized (e.g. started) for a set amount of time (e.g. 5 minutes), access to the vehicle can be denied, even to the user (e.g. by locking the doors or disabling the motor). However, this can be inconvenient for the user. For example, a user may be granted access to the vehicle, and they may enter the vehicle, but may not immediately start the vehicle if they are preoccupied with other tasks. Such a course of events may cause the vehicle access to be disabled, which would force to user to re-initialize access to the vehicle when they are ready. It is desirable to be able to maintain vehicle access for the user, such as by a quick action (e.g. soliciting the user to press a button to confirm they are present, or by connection to user device 130 to confirm presence of the user). However, maintenance of vehicle access should still involve authenticating or verifying the presence or identity of the authorized user, in order to prevent an unauthorized party from using the vehicle if the user is not present.

In sub-act 220, credentials of the user received by the identification device 129 are verified to the virtual key provided to the vehicle device 122, similar to sub-act 212 discussed above. Description of sub-act 212 is applicable to sub-act 220. In sub-act 222, the virtual key provided to the user device 130 is verified to the virtual key provided to the vehicle device 122, similar to sub-act 214 discussed above. Description of sub-act 214 is applicable to sub-act 222.

At 218, vehicle access for the user is maintained in a similarly flexible manner to the access provided in act 210; that is the virtual key is provided to two different devices, to enable initiating and maintaining access by different devices or via different communication pipelines.

Further, the device and pipeline according to which initial authentication and access occurs at act 210 does not have to be the same device and pipeline by which access is maintained at act 218.

In one example, when initially attempting to access the vehicle, the user can be authenticated based on verification of credentials of the user received by the identification device 129 to the virtual key provided to the vehicle device 122, as in sub-act 212, and vehicle access can be provided as in act 216. After providing access to the vehicle for the user, the access can be maintained based on verification of the virtual key provided to the user device 130 to the virtual key provided to the vehicle device 122, as in sub-act 222. To provide a more specific example, a user may attempt to access a vehicle 120 by interacting with identification device 129 (e.g. by scanning an RFID card to an RFID card reader, by touching a fingerprint sensor, or any of the other examples discussed herein). In response, the user's credentials are used for verification to the virtual key provided to vehicle device 122 as in sub-act 212, and vehicle access is provided as in act 216. This interaction may also trigger vehicle device 122 to connect to user device 130 (e.g., the user's smartphone, which is on their person, such as in their pocket or bag), such as by short range wireless connection (e.g. Bluetooth® or wireless network). Since vehicle device 122 is now connected to user device 130, when it becomes necessary to maintain vehicle access for the user, this can be achieved by verification of the virtual key provided to the user device 130 to the virtual key provided to vehicle device 122, as in sub-act 222. This can be performed wirelessly without interaction by the user (since if user device 130 is proximate vehicle 120, then the user also most likely is). Thus, maintaining vehicle access for the user is more streamlined and user-friendly.

The reverse is also possible. As an example, when initially attempting to access the vehicle, the user can be authenticated based on verification of the virtual key provided to the user device 130 to the virtual key provided to the vehicle device 122, as in sub-act 214, and authentication can be provided as in act 216. After providing access to the vehicle for the user, the access can be maintained based on verification of credentials of the user received by the identification device 129 to the virtual key provided to the vehicle device 122, as in sub-act 220.

While the present invention has been described with respect to the non-limiting embodiments, it is to be understood that the invention is not limited to the disclosed embodiments. Persons skilled in the art understand that the disclosed invention is intended to cover various modifications and equivalent arrangements included within the scope of the appended claims. Thus, the present invention should not be limited by any of the described embodiments.

Throughout this specification and the appended claims, infinitive verb forms are often used, such as "to operate" or "to couple". Unless context dictates otherwise, such infinitive verb forms are used in an open and inclusive manner, such as "to at least operate" or "to at least couple".

The specification includes various implementations in the form of block diagrams, schematics, and flowcharts. A person of skill in the art will appreciate that any function or operation within such block diagrams, schematics, and flowcharts can be implemented by a wide range of hardware, software, firmware, or combination thereof. As non-limiting examples, the various embodiments herein can be implemented in one or more of: application-specific integrated circuits (ASICs), standard integrated circuits (ICs), programmable logic devices (PLDs), field-programmable gate arrays (FPGAs), computer programs executed by any number of computers or processors, programs executed by one or more control units or processor units, firmware, or any combination thereof.

The disclosure includes descriptions of several processors. Said processors can be implemented as any hardware capable of processing data, such as application-specific integrated circuits (ASICs), standard integrated circuits (ICs), programmable logic devices (PLDs), field-programmable gate arrays (FPGAs), logic circuits, or any other appropriate hardware. The disclosure also includes descriptions of several non-transitory processor-readable storage mediums. Said non-transitory processor-readable storage mediums can be implemented as any hardware capable of storing data, such as magnetic drives, flash drives, RAM, or any other appropriate data storage hardware.

This disclosure is related to U.S. Provisional Patent Application No. 63/270,844 and U.S. Provisional Patent Application No. 63/227,375, also owned by Geotab Inc., which are incorporated herein by reference in their entirety.

What is claimed is:

1. A system comprising:
 a vehicle device including at least one first processor, a first communication interface communicatively coupled to the at least one first processor, and at least one first non-transitory processor-readable storage medium communicatively coupled to the at least one first processor, the at least one first non-transitory processor-readable storage medium storing first processor-executable instructions; and a reservation management device including at least one second processor, a second communication interface communicatively coupled to the at least one second processor, and at least one second non-transitory processor-readable storage medium communicatively coupled to the at least one second processor, the at least one second non-transitory processor-readable storage medium storing second processor-executable instructions which when executed by the at least one second processor cause the reservation management device to:

generate, by the at least one second processor, a first virtual key in response to a virtual key request received by the second communication interface from a user for accessing, by the user, a vehicle in which the vehicle device is positioned;

provide, by the second communication interface, the first virtual key to the vehicle device; and provide, by the second communication interface, the first virtual key to a first user device accessible to the user, the first user device being a separate device from the vehicle device, wherein the first processor-executable instructions, when executed by the at least one first processor, cause the vehicle device to:

authenticate, by the at least one first processor, the user based on one of:

verification of credentials of the user to the first virtual key provided to the vehicle device, the credentials of the user received by an identification device positioned at the vehicle and communicatively coupled to the vehicle device; or verification of the first virtual key provided to the first user device to the first virtual key provided to the vehicle device;

after authenticating the user, provide access to the vehicle for the user; and after providing vehicle access to the user, maintain vehicle access for the user, by:

if the user was authenticated based on verification of credentials of the user to the first virtual key provided to the vehicle device, the credentials of the user received by an identification device positioned at the vehicle and communicatively coupled to the vehicle device, maintaining vehicle access for the user by authenticating the user based on verification of the first virtual key provided to the first user device to the first virtual key provided to the vehicle device; or if the user was authenticated based on verification of the first virtual key provided to the first user device to the first virtual key provided to the vehicle device, maintaining vehicle access for the user by authenticating the user based on verification of credentials of the user to the first virtual key provided to the vehicle device, the credentials of the user received by the identification device positioned at the vehicle and communicatively coupled to the vehicle device.

2. The system of claim 1, wherein the first processor-executable instructions further cause the vehicle device to send the virtual key request to be received by the reservation management device in response to an interaction event by the user with the identification device.

3. The system of claim 1, wherein the virtual key request is received by the reservation management device from the first user device.

4. The system of claim 3, wherein the virtual key request is received by the reservation management device from the first user device via the vehicle device.

5. The system of claim 1, wherein the virtual key request is received by the reservation management device from a second user device separate from the vehicle device and different from the first user device.

6. The system of claim 5, wherein the virtual key request is received by the reservation management device from the second user device via the internet.

7. The system of claim 1, wherein:

the first processor-executable instructions which cause the vehicle device to authenticate the user cause the at least one first processor to: authenticate the user based on verification of credentials of the user to the first virtual key provided to the vehicle device, the credentials of the user received by the identification device positioned at the vehicle and communicatively coupled to the vehicle device; and the first processor-executable instructions which cause the vehicle device to maintain vehicle access for the user cause the vehicle device to: maintain vehicle access for the user; by authenticating the user based on verification of the first virtual key provided to the first user device to the first virtual key provided to the vehicle device.

8. The system of claim 1, wherein:

the first processor-executable instructions which cause the vehicle device to authenticate the user cause the at least one first processor to: authenticate the user based on verification of the first virtual key provided to the first user device to the first virtual key provided to the vehicle device; and the first processor-executable instructions which cause the vehicle device to maintain vehicle access for the user cause the vehicle device to: maintain vehicle access for the user; by authenticating the user based on verification of credentials of the user to the first virtual key provided to the vehicle device, the credentials of the user received by the identification device positioned at the vehicle and communicatively coupled to the vehicle device.

9. The system of claim 1, further comprising the identification device, wherein the identification device is a device selected from a group of devices consisting of:

an RFID reader;
a biometric sensor; and
a user input device.

10. The system of claim 1, wherein the vehicle device comprises a telematics monitoring device installable in the vehicle.

11. The system of claim 1, wherein the reservation management device comprises a reservation management server.

12. The system of claim 1, wherein the first user device comprises a portable device.

13. The system of claim 1, wherein the first processor-executable instructions which cause the at least one first processor to provide vehicle access to the user cause the at least one first processor to: unlock at least one door of the vehicle.

14. The system of claim 1, wherein the first processor-executable instructions which cause the at least one first processor to provide vehicle access to the user cause the at least one first processor to: enable operation of a motor of the vehicle.

* * * * *